(12) United States Patent
Bizet et al.

(10) Patent No.: US 12,087,976 B2
(45) Date of Patent: Sep. 10, 2024

(54) COMPOSITIONS FOR BIPOLAR PLATES AND PROCESSES FOR MANUFACTURING SAID COMPOSITIONS

(71) Applicant: Arkema France, Colombes (FR)

(72) Inventors: Stéphane Bizet, Serquigny (FR); Jérôme Chauveau, Serquigny (FR)

(73) Assignee: Arkema France, Colombes (FR)

( * ) Notice: Subject to any disclaimer, the term of this patent is extended or adjusted under 35 U.S.C. 154(b) by 623 days.

(21) Appl. No.: 17/277,369

(22) PCT Filed: Sep. 18, 2019

(86) PCT No.: PCT/FR2019/052174
§ 371 (c)(1),
(2) Date: Mar. 18, 2021

(87) PCT Pub. No.: WO2020/058626
PCT Pub. Date: Mar. 26, 2020

(65) Prior Publication Data
US 2022/0037677 A1   Feb. 3, 2022

(30) Foreign Application Priority Data
Sep. 21, 2018 (FR) ...................... 1858597

(51) Int. Cl.
| | | |
|---|---|---|
| H01M 8/0226 | (2016.01) | |
| B29C 45/00 | (2006.01) | |
| C08J 3/12 | (2006.01) | |
| C08J 3/20 | (2006.01) | |
| C08K 3/04 | (2006.01) | |
| H01M 8/0213 | (2016.01) | |
| H01M 8/0221 | (2016.01) | |
| H01M 8/18 | (2006.01) | |
| B29K 27/00 | (2006.01) | |
| B29K 105/00 | (2006.01) | |
| B29L 31/34 | (2006.01) | |

(52) U.S. Cl.
CPC ....... H01M 8/0226 (2013.01); B29C 45/0001 (2013.01); C08J 3/12 (2013.01); C08J 3/201 (2013.01); C08J 3/203 (2013.01); C08K 3/04 (2013.01); H01M 8/0213 (2013.01); H01M 8/0221 (2013.01); *H01M 8/184* (2013.01); *B29K 2027/16* (2013.01); *B29K 2105/0023* (2013.01); *B29L 2031/3468* (2013.01); *C08J 2327/16* (2013.01); *C08K 2201/001* (2013.01); *C08K 2201/014* (2013.01)

(58) Field of Classification Search
CPC ........ B29L 2031/3468; C08K 2327/16; C08K 2201/001; C08K 2201/024
See application file for complete search history.

(56) References Cited

U.S. PATENT DOCUMENTS

| | | | | |
|---|---|---|---|---|
| 4,339,322 A | * | 7/1982 | Balko | C25B 9/65 204/255 |
| 2002/0136941 A1 | | 9/2002 | Bonnet et al. | |
| 2003/0089890 A1 | * | 5/2003 | Niu | C08K 7/24 252/500 |
| 2004/0028993 A1 | | 2/2004 | Jousse et al. | |
| 2013/0085220 A1 | * | 4/2013 | Supriya | C08L 27/18 525/190 |
| 2013/0115526 A1 | * | 5/2013 | Friesen | H01M 12/08 156/60 |
| 2013/0288118 A1 | | 10/2013 | Kim et al. | |
| 2014/0001416 A1 | | 1/2014 | Fiffemeier et al. | |
| 2015/0147620 A1 | * | 5/2015 | Lee | H01M 8/0206 429/105 |
| 2015/0303481 A1 | | 10/2015 | Duong et al. | |
| 2018/0030277 A1 | | 2/2018 | Zhai et al. | |

FOREIGN PATENT DOCUMENTS

| | | | | |
|---|---|---|---|---|
| CN | 1354482 | * | 6/2002 | ............... H01B 1/24 |
| CN | 104269558 A | | 1/2015 | |
| CN | 107046140 B | | 8/2017 | |
| JP | 2009231034 A2 | | 10/2009 | |
| KR | 100660144 B1 | | 12/2006 | |

OTHER PUBLICATIONS

Radhakrishnan, S. et al; "High-temperature, Polymer-graphite Hybrid Composites for Bipolar Plates: Effect of Processing Conditions on Electrical Properties"; Journal of Power Sources; 2006; vol. 163, pp. 702-707.

Mighri, F. et al; "Electrically Conductive Thermoplastic Blends for Injection and Compression Molding of Bipolar Plates in the Fuel Cell Application"; Polymer Engineering and Science; 2004; vol. 44, No. 9.

* cited by examiner

*Primary Examiner* — Nahida Sultana
(74) *Attorney, Agent, or Firm* — Joanne Rossi

(57) ABSTRACT

The present invention relates to new compositions for bipolar plates and processes for manufacturing said compositions. More particularly, the invention relates to a process for manufacturing a composition, comprising the following steps: —mixing a thermoplastic polymer in the molten state with a first conductive filler in order to obtain a conductive thermoplastic polymer, —grinding said conductive thermoplastic polymer in order to reduce it to powder; —mixing the conductive thermoplastic polymer powder with a second conductive filler.

13 Claims, No Drawings

COMPOSITIONS FOR BIPOLAR PLATES AND PROCESSES FOR MANUFACTURING SAID COMPOSITIONS

This application is a national stage application under 35 U.S.C. § 371 of PCT Application PCT/FR2019/052174, filed Sep. 18, 2019; which claims benefit to French National Patent Number 1858597, filed Sep. 21, 2018; said applications incorporated herein by reference.

TECHNICAL FIELD

The present invention relates to novel compositions for bipolar plates, to processes for manufacturing said compositions, to the bipolar plates obtained from said compositions and to processes for manufacturing said plates by injection.

TECHNICAL CONTEXT

Bipolar plates are used in fuel cells and in redox flow batteries. They may be made from various materials: metallic bipolar plates, graphite plates and carbon-polymer composite plates.

The principle of bipolar plates based on organic composite materials is based on the use of conductive fillers (carbon, graphite, etc.) dispersed in a thermoplastic or thermosetting polymer. The fillers provide bipolar plates with the electrical conductivity required for collecting current and the polymer matrix provides them with the proper mechanical strength required for the assembly of the various elements.

Carbon-polymer composite bipolar plates have advantageous properties: high electrical conductivity, good corrosion resistance, good performance at high temperatures, and good mechanical properties, together with a manufacturing cost which is relatively low. In these composite bipolar plates, a thermosetting or thermoplastic polymer is used as a matrix for a carbon-based filler chosen from graphite, carbon fibers, carbon black or carbon nanotubes. Although the electrical performance of the composite bipolar plates is mainly determined by the carbon-based filler, the material making up the polymer matrix has also an influence on the electrical behavior of the composite.

Thermosetting polymer-graphite composites are preferred materials for manufacturing bipolar plates. However, composite materials based on thermoplastic polymers, notably thermoplastics which are stable at high temperatures, have already been used for manufacturing bipolar plates, by virtue of their ability to be injection-molded, which makes them more suitable for automated manufacture. Such composites were prepared using polyphenylene sulfide (PPS) or polyether sulfone (PES) containing graphite powder, as reported by Radhakrishnan, S. et al. in the publication: "High-temperature, Polymer-graphite Hybrid Composites for Bipolar Plates: Effect of Processing Conditions on Electrical Properties", *Journal of Power Sources*, 2006, Vol. 163, pages 702-707.

The publication by Mighri F. et al. "Electrically conductive thermoplastic blends for injection and compression molding of bipolar plates in the fuel cell application", *Polymer Engineering and Science*, 2004, volume 44, No. 9 describes bipolar plates prepared using compression and injection processes starting from graphite, carbon black and polypropylene or polyphenylene sulfide.

Among these two main processes for manufacturing graphite/polymer composite bipolar plates, the injection process is the process which makes it possible to reduce the manufacturing cycle times. It thus opens up perspectives for significant cost reductions. However, it has a few drawbacks in comparison with compression. Notably, given the high contents of filler, the formulation is very viscous and becomes difficult to manufacture via the injection process. The content of polymer used is generally increased compared with the compression process, so as to retain easy implementation. The use of higher contents of polymer binder has the drawback of reducing the conductivity of the plates. The main challenge is thus to find the best compromise between the formulation viscosity and the plate conductivity. Moreover, in this type of process, it is frequent that the surface of the plate is enriched in polymer, due to preferential migration toward the surface. Consequently, the surface conductivity is reduced and an additional step of surface treatment is required for removing this layer which is less conductive.

There is a need to provide a composition for manufacturing bipolar plates by injection, the viscosity of which is adapted to the process for injecting the bipolar plate.

SUMMARY OF THE INVENTION

According to a first aspect, the invention relates to the manufacture of a composition, comprising the following steps:
  mixing a molten thermoplastic fluoropolymer with a first conductive filler so as to obtain a conductive fluoropolymer;
  milling said conductive fluoropolymer to reduce it to powder;
  mixing the conductive fluoropolymer powder with a second conductive filler.

According to one embodiment, the second conductive filler is graphite.

According to one embodiment, the first conductive filler is chosen from: electronic conductive polymers, fillers derived from carbon such as graphite, carbon fibers, carbon nanotubes, carbon blacks, graphene and mixtures thereof, the first conductive filler preferably being carbon black.

The invention also relates to a composition obtained via the process described above.

The invention also relates to a composition comprising a second conductive filler and particles of a conductive fluoropolymer. In a characteristic manner, the particles of the conductive fluoropolymer comprise a fluoropolymer matrix in which a first conductive filler is dispersed.

According to one embodiment, in the composition according to the invention, the conductive fluoropolymer is present in an amount ranging from 10% to 70%, preferably from 10% to 40%, advantageously from 15% to 30%, and the second conductive filler is present in an amount ranging from 30% to 90%, preferably from 60% to 90%, advantageously from 70% to 85%, based on the total weight of the composition.

According to one embodiment, in the conductive fluoropolymer composition, the first conductive filler is present in an amount ranging from 0.1% to 20%, preferably from 0.1% to 10%, advantageously from 0.25% to 8%, based on the total weight of said composition.

According to another aspect, the invention relates to a process for manufacturing a bipolar plate, comprising the following steps:
  preparing a composition according to the process described above, or providing a composition as described above, and
  subjecting said composition to injection molding.

The invention also relates to a bipolar plate obtained via the process described above or comprising the composition described above.

The present invention makes it possible to overcome the drawbacks of the prior art. It more particularly provides compositions which can be easily implemented for manufacturing bipolar plates which do not have any insulating domain, which is reflected by improved conductivity in comparison with a nonconductive PVDF fluoropolymer+graphite plate composition.

This is achieved by virtue of the use of a binder comprising a fluoropolymer in which a conductive filler is dispersed. The use of an electrically conductive binder thus obtained has several advantages. Firstly, the use of a conductive binder makes it possible to decrease the resistivity of the plates by reducing, or even eliminating, the electrical insulating domains of polymer between the particles of the main filler of the plate. Secondly, it makes it possible to avoid subsequent treatment of the bipolar plate surfaces, for example by sandblasting, which is often required following plate manufacture via injection molding, in order to remove the layer of insulating polymer when the binder consists of only one thermoplastic polymer.

The invention also provides a process for preparing compositions having the abovementioned advantages. Mixing a molten fluoropolymer with a first conductive filler, and then incorporating into said mixture a second conductive filler, in a separate step, makes it possible to obtain a composite bipolar plate composition in which the binder comprises a conductive fluoropolymer, i.e., a fluoropolymer in which a first conductive filler is dispersed. The conductive fluoropolymer may then be easily implemented.

DESCRIPTION OF EMBODIMENTS OF THE INVENTION

The invention is described in further detail below.
The percentages indicated herein are mass percentages.

Bipolar Plate Composition

According to a first aspect, the invention relates to a composition that is suitable for use in manufacturing bipolar plates. The composition comprises a mixture of particles of a carbon-based conductive filler, referred to herein as "second conductive filler", and particles of a conductive fluoropolymer, which comprise a conductive filler (referred to herein as "first conductive filler") dispersed in a thermoplastic polymer matrix.

According to various embodiments, said composition comprises the following features, combined where appropriate.

The composition may be in the form of a powder and, in this case, the conductive fluoropolymer particles are mixed with the second conductive filler particles.

According to another embodiment, the composition may be in agglomerated solid form, and, in this case, the second conductive filler particles are bound to the particles (or domains) of conductive fluoropolymer. It is in this agglomerated form that the composition is shaped as a bipolar plate.

Dispersing the first conductive filler in the fluoropolymer results in the latter being conductive. A fluoropolymer is considered conductive when the resistance of a filament of said polymer, produced for example using a capillary rheometer, is less than $10^6$ ohms. Preferably, the loading of the first conductive filler is such that the percolation threshold through the fluoropolymer matrix is reached.

Preferably, the second conductive filler and the first conductive filler dispersed in the fluoropolymer are different from each other as regards their mean size or their size distribution and/or their nature.

Advantageously, the second conductive filler is graphite.

The volume-mean diameter (Dv50) of the second conductive filler may be less than or equal to 2500 µm, preferably less than or equal to 1000 µm, and more preferably less than or equal to 500 µm.

According to certain embodiments, the Dv50 of the second conductive filler ranges from 10 µm to 50 µm, or from 50 to 100 µm, or from 100 to 150 µm, or from 150 to 200 µm, or from 200 to 250 µm, or from 250 to 300 µm, or from 300 to 350 µm, or from 350 to 400 µm, or from 400 to 450 µm, or from 450 to 500 µm, or from 500 to 600 µm, or from 600 to 700 µm, or from 700 to 800 µm, or from 800 to 900 µm, or from 900 to 1000 µm, or from 1000 to 1100 µm, or from 1100 to 1200 µm, or from 1200 to 1300 µm, or from 1300 to 1400 µm, or from 1400 to 1500 µm, or from 1500 to 1600 µm, or from 1600 to 1700 µm, or from 1700 to 1800 µm, or from 1900 to 2000 µm, or from 2000 to 2100 µm, or from 2100 to 2200 µm, or from 2200 to 2300 µm, or from 2300 to 2400 µm, or from 2400 to 2500 µm.

The Dv50 is the particle diameter at the 50th percentile of the cumulative particle size distribution. This parameter may be measured by laser granulometry.

The composition may comprise from 30% to 90% by weight of a second conductive filler, based on the total weight of the composition. According to certain embodiments, the composition comprises, by weight, from 30 to 45%, or from 35 to 40%, or from 40 to 45%, or from 45 to 50%, or from 50 to 55%, or from 55 to 60%, or from 60 to 65%, or from 65 to 70%, or from 70 to 75%, or from 75 to 80%, or from 80 to 85%, or from 85 to 90%, of a second conductive filler, based on the total weight of the composition.

The conductive fluoropolymer particles may have a Dv50 ranging from 0.1 µm to 1 mm, more particularly from 0.1 µm to 5 µm, or from 5 µm to 50 µm, or from 50 µm to 100 µm, or from 100 µm to 200 µm, or from 200 µm to 300 µm, or from 300 µm to 400 µm, or from 400 µm to 500 µm, or from 500 µm to 600 µm, or from 600 µm to 700 µm, or from 700 µm to 800 µm, or from 800 µm to 900 µm, or from 900 µm to 1 mm.

The first conductive filler dispersed in the conductive fluoropolymer may be an electronic conductive polymer. Electronic conductive polymers which are suitable for this purpose are polyacetylene, polyphenylene vinylene, polythiophene, polyaniline, polypyrrole and poly(phenylene sulfide) polymers or mixtures thereof. According to another embodiment variant, or in addition, the first conductive filler may comprise electrically conductive carbon particles, such as carbon black, carbon nanotubes, graphene, graphite, carbon fibers or a mixture of two types of particles from this list.

The first conductive filler dispersed in the fluoropolymer matrix may have a specific surface area, measured by nitrogen adsorption via the BET method according to the standard ASTM D3037, ranging from 0.1 $m^2/g$ to 2000 $m^2/g$ and preferably from 10 $m^2$ to 1000 $m^2/g$.

According to certain embodiments, the first conductive filler may have a BET specific surface area ranging from 0.1 to 1 $m^2/g$, or from 1 to 10 $m^2/g$, or from 10 to 50 $m^2/g$, or from 10 to 50 $m^2/g$, or from 50 to 200 $m^2/g$, or from 200 to 400 $m^2/g$, or from 400 to 600 $m^2/g$, or from 600 to 800 $m^2/g$, or from 800 to 1000 $m^2/g$, or from 1000 to 1200 $m^2/g$, or from 1200 to 1400 m²/g, or from 1400 to 1600 m²/g, or from 1600 to 1800 m²/g, or from 1800 to 2000 m2/g.

The fluoropolymer contains in its chain at least one monomer chosen from compounds containing a vinyl group capable of opening in order to polymerize and which contains, directly attached to this vinyl group, at least one fluorine atom, a fluoroalkyl group or a fluoroalkoxy group.

According to one embodiment, this monomer may be vinyl fluoride, vinylidene fluoride, trifluoroethylene, chlorotrifluoroethylene, 1,2-difluoroethylene, tetrafluoroethylene, hexafluoropropylene; perfluoro(alkyl vinyl) ethers such as perfluoro(methyl vinyl)ether, perfluoro(ethyl vinyl) ether or perfluoro(propyl vinyl) ether; perfluoro(1,3-dioxole); perfluoro(2,2-dimethyl-1,3-dioxole); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_m$ and m is 1, 2, 3 or 4; the product of formula $R_2OCF=CH_2$ in which $R_2$ is $F(CF_2)p$ and p is 1, 2, 3 or 4; perfluorobutyl ethylene; 3,3,3-trifluoropropene or 2-trifluoromethyl-3,3,3-trifluoro-1-propene.

The fluoropolymer may be a homopolymer or a copolymer. The copolymer may also comprise nonfluorinated monomers such as ethylene.

According to one embodiment, the fluoropolymer is a polymer comprising units derived from vinylidene fluoride, and is preferably chosen from polyvinylidene fluoride homopolymer and copolymers comprising vinylidene fluoride units and units derived from at least one other comonomer that is copolymerizable with vinylidene fluoride.

The fluoropolymer is preferably vinylidene fluoride homopolymer.

According to one embodiment, the fluoropolymer is a copolymer comprising vinylidene fluoride (VDF) units and units derived from one or more monomers. These other monomers are chosen from the following list: vinyl fluoride; trifluoroethylene; chlorotrifluoroethylene; 1,2-difluoroethylene, tetrafluoroethylene; hexafluoropropylene; perfluoro(alkyl vinyl)ethers such as perfluoro(methyl vinyl)ether, perfluoro(ethyl vinyl)ether or perfluoro(propyl vinyl)ether; perfluoro(1,3-dioxole); perfluoro(2,2-dimethyl-1,3-dioxole); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R'CH_2OCF=CF_2$ in which R' is hydrogen or $F(CF_2)_z$ and z is 1, 2, 3 or 4; the product of formula $R''OCF=CH_2$ in which R" is $F(CF_2)_z$ and z is 1, 2, 3 or 4; perfluorobutylethylene; 3,3,3-trifluoropropene or 2-trifluoromethyl-3,3,3-trifluoro-1-propene.

Among these VDF comonomers, hexafluoropropylene is preferred. The VDF copolymers may also comprise non-fluorinated monomers such as ethylene.

In the VDF copolymers, the mass content of the VDF units is at least 50%, preferably at least 60%, more preferably greater than 70% and advantageously greater than 80%.

The fluoropolymer may be a mixture of one or more polymers described above.

According to one embodiment, in the composition according to the invention, the conductive fluoropolymer is present in an amount ranging from 10% to 70%, preferably from 10% to 40%, advantageously from 15% to 30%, based on the total weight of the composition.

According to one embodiment, the fluoropolymer has a viscosity of less than or equal to 1500 Pa·s, preferably of less than or equal to 1000 Pa·s, at a temperature of 230° C. and at a shear rate of 100 s$^{-1}$. The viscosity is measured at 230° C., at a shear rate of 100 s$^{-1}$, using a capillary rheometer or a parallel-plate rheometer, according to the standard ASTM D3825.

Bipolar Plate

The invention also relates to a bipolar plate comprising the composition described above, in an agglomerated form. A bipolar plate is a plate which separates the elementary cells in fuel cells and redox flow batteries. In general, it has a parallelepipedal shape having a thickness of a few millimeters (typically between 0.2 and 6 mm) and comprises on each face a network of channels for the circulation of gases and fluids. Its role consists in feeding the fuel cell with gaseous fuel, eliminating the reaction products and collecting the electrical current produced by the cell.

Processes

According to another aspect, the invention relates to a process for manufacturing the composition described above, comprising the following steps:
 mixing the molten fluoropolymer with the first conductive filler so as to obtain the conductive fluoropolymer;
 milling said conductive fluoropolymer to reduce it to powder;
 mixing the conductive fluoropolymer powder with the second conductive filler.

In this process, the first conductive filler, the fluoropolymer and the second conductive filler may have any feature described above as being optional or preferred, relating to the bipolar plate composition.

The process according to the invention comprises a step of melt-blending the fluoropolymer with the first conductive filler so as to obtain the conductive fluoropolymer. This step makes it possible to formulate an intimate mixture of fluoropolymer with the first conductive filler, the mixture being called the "conductive fluoropolymer". Preferably, said first conductive filler is dispersed in the fluoropolymer. Preferably, the polymer and the first conductive filler to be melt-blended are in powder form.

The first conductive filler dispersed in the fluoropolymer matrix may have a specific surface area measured by nitrogen adsorption via the BET according to the standard ASTM D3037 ranging from 0.1 m²/g to 2000 m²/g and preferably from 10 m² to 1000 m²/g. According to certain embodiments, the first conductive filler may have a BET specific surface area ranging from 0.1 to 1 m²/g, or from 1 to 10 m²/g, or from 10 to 50 m²/g, or from 10 to 50 m²/g, or from 50 to 200 m²/g, or from 200 to 400 m²/g, or from 400 to 600 m²/g, or from 600 to 800 m²/g, or from 800 to 1000 m²/g, or from 1000 to 1200 m²/g, or from 1200 to 1400 m²/g, or from 1400 to 1600 m²/g, or from 1600 to 1800 m²/g, or from 1800 to 2000 m²/g.

According to one embodiment, the melt-blending step is performed by extrusion, using, for example, a blender or a twin-screw extruder. In order to obtain good dispersion of the first conductive fillers in the fluoropolymer, a screw profile resulting in dispersive mixing by virtue of a high shear rate will be preferred.

According to one embodiment, in a conventional extrusion process for melt-blending a fluoropolymer with the first conductive filler, the polymer granules are melted by conveying them along the screw which is heated to temperatures ranging from Tm+20 to Tm+70° C. (Tm being the melting point of the fluoropolymer). The conductive filler is preferably fed by means of a metering unit. Preferably, after extrusion, the granules are obtained using a filament cutting process or by wet granulation.

The conductive fluoropolymer may contain, by weight, from 0.1% to 1%, or from 1% to 2.5%, or from 2.5% to 5%, or from 5% to 10%, or from 10% to 15%, or from 15% to 20% of the first conductive filler, based on the weight of the conductive fluoropolymer.

The conductive fluoropolymer may be produced in the form of granules.

The process according to the invention also comprises a step of milling said conductive fluoropolymer, to reduce it to powder. Any milling means may be used, for example a hammer mill. According to certain embodiments, the conductive fluoropolymer powder may have a Dv50 ranging from 0.1 μm to 1 mm, more particularly from 0.1 μm to 5 μm, or from 5 μm to 50 μm, or from 50 μm to 100 μm, or from 100 μm to 200 μm, or from 200 μm to 300 μm, or from 300 μm to 400 μm, or from 400 μm to 500 μm, or from 500 μm to 600 μm, or from 600 μm to 700 μm, or from 700 μm to 800 μm, or from 800 μm to 900 μm, or from 900 μm to 1 mm.

The conductive fluoropolymer powder is then mixed with the second conductive filler.

The second conductive filler may be in powder form. The volume-mean diameter (Dv50) of the second conductive filler may be less than or equal to 2500 μm, preferably less than or equal to 1000 μm, and more preferably less than or equal to 500 μm.

According to certain embodiments, the Dv50 of the second conductive filler ranges from 10 μm to 50 μm, or from 50 to 100 μm, or from 100 to 150 μm, or from 150 to 200 μm, or from 200 to 250 μm, or from 250 to 300 μm, or from 300 to 350 μm, or from 350 to 400 μm, or from 400 to 450 μm, or from 450 to 500 μm, or from 500 to 600 μm, or from 600 to 700 μm, or from 700 to 800 μm, or from 800 to 900 μm, or from 900 to 1000 μm, or from 1000 to 1100 μm, or from 1100 to 1200 μm, or from 1200 to 1300 μm, or from 1300 to 1400 μm, or from 1400 to 1500 μm, or from 1500 to 1600 μm, or from 1600 to 1700 μm, or from 1700 to 1800 μm, or from 1900 to 2000 μm, or from 2000 to 2100 μm, or from 2100 to 2200 μm, or from 2200 to 2300 μm, or from 2300 to 2400 μm, or from 2400 to 2500 μm.

The mixing step may be performed by incorporating the second conductive filler into the conductive fluoropolymer powder. Advantageously, this step may be performed by compounding in an extruder, for example in a twin-screw extruder.

According to one embodiment, the conductive fluoropolymer is present in an amount ranging from 10% to 70%, preferably from 10% to 40%, advantageously from 15% to 30%, based on the total weight of the composition. The conductive fluoropolymer is preferably present in a mass proportion ranging from 10% to 15%, or from 15% to 20%, or from 20% to 25%, or from 25% to 30%, or from 30% to 35%, or from 35% to 40%, based on the total weight of the bipolar plate composition.

The second conductive filler may be present in a mass proportion of from 30% to 90%, from 40% to 45%, or from 45% to 50%, or from 50% to 55%, or from 55% to 60%, or from 60% to 65%, or from 65% to 70%, or from 70% to 75%, or from 75% to 80%, or from 80% to 85%, or from 85% to 90%, based on the total weight of the bipolar plate composition.

The invention also relates to a bipolar plate composition manufactured by means of the process described above.

According to another aspect, the invention relates to a process for manufacturing a bipolar plate, comprising the following steps:
preparing a composition according to the process described above;
subjecting the composition to injection molding.

Preferably, the bipolar plate composition is subjected to injection molding in powder form.

The process according to the invention may also comprise an additional step of milling said powder, for example by means of a disk mill.

The compositions of the invention are particularly well suited to the manufacture of composite bipolar plates via the injection molding process. The injection molding process consists of several steps. Firstly, granules or powders of polymer or of polymer/filler mixture are introduced into an extruder via a feed hopper. Once introduced, the material is transported into the barrel where it is simultaneously heated, sheared and conveyed toward the mold via the extrusion screw. The material is maintained momentarily in the barrel and pressurized before the injection phase. When the appropriate pressure is reached, the material is injected into a mold having the shape and dimensions of the final object desired, the mold temperature being regulated. The duration of the cycle depends on the size of the parts and of the solidification time of the polymer. Maintaining the material under pressure once injected into the mold limits the deformation and shrinkage after stripping from the mold. For ejecting the parts, the mold pieces separate, the core retracts and ejectors are pushed so that the parts can be detached from the mold surface.

The injection process parameters are manifold: temperature of the material during the plasticization step, injection rate, injection pressure of the material, maintenance time and pressure in the mold, mold temperature.

In the case of the injection of composite bipolar plates of the invention, the temperature profile applied along the extrusion screw may vary from 100° C. to 280° C. from the feed zone to the injection head. The mold temperature may range from room temperature to 280° C. Several mold cooling processes may be used. The material may be injected into a mold kept at a temperature between the melting point and the glass transition temperature for a semicrystalline polymer. In the case of a polyvinylidene fluoride homopolymer, the injection mold temperature is typically between 40° C. and 140° C. Moreover, there are injection processes for which the mold temperature varies during the injection cycle. In this type of process, the material is first injected into a mold which has a temperature above the melting point for a semicrystalline thermoplastic polymer. This phase promotes filling of the mold. In the case of a polyvinylidene fluoride homopolymer, the injection mold temperature during this first phase is typically between 170° C. and 280° C. The mold is then cooled to a temperature between the melting point and the glass transition temperature for a semicrystalline polymer, so as to promote crystallization. The injection mold temperature during this second phase is typically between 40° C. and 140° C. for a polyvinylidene fluoride homopolymer. Commercial versions of these variable mold temperature processes are available. For example, mention may be made of the Roctool, Variotherm and Variomelt technologies.

The other injection parameters such as the injection rate, the injection pressure of the material, the maintenance time and pressure in the mold, depend on the geometry of the mold and its dimensions, and on the size and position of the gatings.

EXAMPLES

Products:
PVDF1: Vinylidene fluoride homopolymer sold by Arkema and characterized by a viscosity, measured by capillary rheometry, of 300 Pa·s at 100 s$^{-1}$ and 230° C.
PVDF2: Vinylidene fluoride homopolymer characterized by a viscosity, measured by capillary rheometry, of 60 Pa·s at 100 s$^{-1}$ and 230° C.
PVDF3: Vinylidene fluoride homopolymer characterized by a viscosity, measured by capillary rheometry, of 2000 Pa·s at 100 s$^{-1}$ and 230° C.
Carbon black: Conductive carbon black sold by the company Imerys under the name Ensaco® 260G, having a specific surface area of 70 m$^2$/g.
Graphite: Grade 70200 from the company Richard Anton.

Preparation of the Conductive PVDF Formulations

PVDF and carbon black mixtures were prepared by the extrusion process using a BUSS 15D co-kneader. Formulations were prepared using a flow rate of 15 kg/h, a screw speed of 285 rpm and a temperature of 220° C.

The conductive PVDF granules obtained following the extrusion step are cryo-milled using a Mikropull 2DH hammer mill, so as to obtain a mean particle size defined by a Dv50 of 350 μm.

Preparation of the Conductive PVDF/Graphite Mixtures

Graphite and conductive PVDF powder are mixed by dry-mixing. The powder mixture undergoes an additional step of homogenization in an internal mixer of Brabender type. The powder is introduced into the mixing chamber which has a set temperature of 240° C. The speed of the blades is 80 rpm. The duration of the mixing is set at 15 minutes.

Forming of the Conductive PVDF/Graphite Mixtures

A capillary rheometer of Rheo-tester 2000 type from Göttfert is used to evaluate the injection capacity of the conductive PVDF/graphite formulations and to produce rods, the electrical resistance of which was measured. The temperature is set at 250° C. with a preheating time of 5 minutes. The rheometer is equipped with a die 3 mm in diameter and 30 mm long, and with a 1400-bar pressure transducer (reference 131055).

Measurement of the Electrical Properties

The resistance of each formulation was measured on a rod produced during a capillary rheometry test with a fixed shear gradient. The measurement was performed using a four-point probe method. The tests were performed using a Sefelec M1500P resistivity meter, used as the power source. Four silver lacquer marks were made on the rods at the site of the crocodile clips connecting the sample to the power supply, to a voltmeter and an ammeter used to collect the voltage and intensity of the current passing through the circuit. Thus, plotting a curve linking the intensity passing through the circuit to the voltage makes it possible to arrive at the rod resistance using Ohm's law.

Examples of Formulations Based on Conductive PVDF of the Invention

TABLE 1

|  | Composition 1 | Composition 2 | Composition 3 |
|---|---|---|---|
| PVDF1 | 46.25 | 47 | 94 |
| PVDF2 | 46.25 | 47 |  |
| Carbon black | 7.5 | 6 | 6 |

Examples of Conductive PVDF/Graphite Compositions (Weight %)

TABLE 2

|  | Example 1 | Example 2 | Example 3 | Comparative example |
|---|---|---|---|---|
| Graphite | 75% | 75% | 75% | 75% |
| Composition 1 | 25% |  |  |  |
| Composition 2 |  | 25% |  |  |
| Composition 3 |  |  | 25% |  |
| PVDF3 |  |  |  | 25% |

Results of the Electrical Properties

TABLE 3

|  | Resistance of a rod produced at a shear of 37 s$^{-1}$ |
|---|---|
| Example 1 | 0.5 ohm |
| Example 2 | 0.6 ohm |
| Example 3 | 0.6 ohm |
| Comparative example | 2 ohms |

The results presented in Table 3 show that the resistance of Graphite/Conductive PVDF compositions is lower than that of Graphite/Nonconductive PVDF compositions.

The invention claimed is:

1. A process for manufacturing a composition, comprising the following steps:
   mixing a molten thermoplastic fluoropolymer with a first conductive filler so as to obtain a conductive fluoropolymer;
   milling said conductive fluoropolymer to reduce it to powder having a volume-mean diameter (Dv50) ranging from 10 μm to 1 mm;
   mixing the conductive fluoropolymer powder with a second conductive filler, wherein the first conductive filler is present in an amount ranging from 0.1% to 8%, based on the weight of the conductive fluoropolymer composition, and
wherein the second conductive filler is present in an amount ranging from 40% to 90%, based on the total weight of the composition.

2. The process of claim 1, wherein the second conductive filler is graphite.

3. The process of claim 1 wherein the first conductive filler is chosen from: electronic conductive polymers, carbon black, carbon nanotubes, graphene, graphite, carbon fibers and mixtures thereof.

4. The process of claim 1, wherein the step in which the conductive fluoropolymer powder is mixed with a second conductive filler is a compounding step performed in an extruder.

5. The process of claim 1, wherein the conductive fluoropolymer is present in an amount ranging from 10% to 60% and the second conductive filler is present in an amount ranging from 40% to 90% based on the total weight of the composition.

6. The process of claim 1, wherein the thermoplastic fluoropolymer is chosen from polyvinylidene fluoride homopolymer and copolymers comprising vinylidene fluoride units and units derived from at least one other comonomer that is copolymerizable with vinylidene fluoride.

7. A composition comprising a second conductive filler and particles of a conductive fluoropolymer, characterized in that the particles of the conductive fluoropolymer comprise a fluoropolymer matrix in which a first conductive filler is dispersed, wherein the second conductive filler is present in an amount ranging from 40% to 90%, based on the total weight of the composition and the first conductive filler is present in an amount ranging from 0.1% to 8%, based on the weight of the conductive fluoropolymer.

8. The composition of claim 7, wherein the second conductive filler is graphite and/or the first conductive filler is chosen from: electronic conductive polymers, carbon black, carbon nanotubes, graphene, graphite, carbon fibers and mixtures thereof.

9. The composition of claim 7, wherein the second conductive filler is present in an amount ranging from 60% to 90% based on the total weight of the composition and/or the first conductive filler is present in an amount ranging from 0.25% to 8% based on the weight of the conductive fluoropolymer composition.

10. A process for manufacturing a bipolar plate, comprising the following steps:
    preparing a composition according to the process of claim 1;
    subjecting the composition to injection molding.

11. The bipolar plate obtained via the process of claim 10.

12. A process for manufacturing a bipolar plate, comprising the following steps:
    providing the composition of claim 7;
    subjecting the composition to injection molding.

13. The bipolar plate obtained via the process of claim 12.

* * * * *